Jan. 15, 1963  C. F. BUECHELE ET AL  3,073,012
METHOD OF MAKING PRESSURE WELDED PASSAGEWAY
PANEL CONTAINING ACCUMULATOR CHAMBER
Filed Aug. 29, 1957  4 Sheets-Sheet 1

INVENTOR.
CALVIN F. BUECHELE
BY ARNOLD U. HURST

ATTORNEY

Jan. 15, 1963   C. F. BUECHELE ET AL   3,073,012
METHOD OF MAKING PRESSURE WELDED PASSAGEWAY
PANEL CONTAINING ACCUMULATOR CHAMBER
Filed Aug. 29, 1957   4 Sheets-Sheet 2

INVENTOR.
CALVIN F. BUECHELE
ARNOLD U. HURST
BY
Arthur N Robert
ATTORNEY

Jan. 15, 1963   C. F. BUECHELE ET AL   3,073,012
METHOD OF MAKING PRESSURE WELDED PASSAGEWAY
PANEL CONTAINING ACCUMULATOR CHAMBER
Filed Aug. 29, 1957   4 Sheets-Sheet 3

INVENTOR.
CALVIN F. BUECHELE
ARNOLD U. HURST
BY
Arthur H. Robert
ATTORNEY

Jan. 15, 1963   C. F. BUECHELE ET AL   3,073,012
METHOD OF MAKING PRESSURE WELDED PASSAGEWAY
PANEL CONTAINING ACCUMULATOR CHAMBER
Filed Aug. 29, 1957   4 Sheets-Sheet 4

INVENTOR.
CALVIN F. BUECHELE
ARNOLD U. HURST
BY Arthur J. Robert
ATTORNEY

United States Patent Office 3,073,012
Patented Jan. 15, 1963

3,073,012
METHOD OF MAKING PRESSURE WELDED PASSAGEWAY PANEL CONTAINING ACCUMULATOR CHAMBER
Calvin F. Buechele, Louisville, and Arnold U. Hurst, Valley Station, Ky., assignors to Reynolds Metals Company, Richmond, Va., a corporation of Delaware
Filed Aug. 29, 1957, Ser. No. 681,123
11 Claims. (Cl. 29—157.3)

This invention relates to the making of pressure welded passageway panels.

Conventional pressure welded passageway panels are hydraulically dilated or expanded with the panel supported between a pair of opposed and spaced flat platens in accordance with the method described in the U.S. Patent No. 2,662,273 to George R. Long. This practice results in the formation of the flat walled passages which are equal in expanded height regardless of their width. Because of this production of flat walled passages, it has been considered impractical to provide pressure welded refrigeration evaporator panels with large passages because the large area flat walls enclosing the large passages do not have the strength to withstand the internal pressures of the conventional refrigerating system without bulging or otherwise distorting the panel. Because of this limitation to the maximum size passage which can be practically made in a pressure welded evaporator panel, a problem exists in the formation of large chambers, such as accumulator chambers, in pressure welded evaporator panels.

One answer to this problem is the "grid" or "waffle" type of accumulator, illustrated in the U.S. Patent No. 2,712,736 to Wurtz et al., in which the opposed flat walls enclosing the accumulator are attached together at a series of intermediate points by weld spots to support them from spreading apart. The "grid" type of accumulator is not completely satisfactory because, in order for it to have a substantial volume, it must be spread over an unduly large area of the evaporator panel and, sometimes, must be divided into a pair of accumulator chambers, such as illustrated by said Wurtz et al. patent.

Another answer to this problem is the mechanically expanded "dulbar" accumulator chamber illustrated by the U.S. Patent No. 2,740,188 to Edward C. Simmons. Simmons proposes to pressure weld the evaporator panel with the accumulator area arranged to extend from one edge of the panel to the opposite edge and to mechanically open the accumulator chamber, by the insertion of a suitable tool, prior to hydraulically expanding the remaining small passages. After being mechanically expanded, the open ended accumulator chamber is closed by welding caps at both ends and the small passages are hydraulically expanded. This method is undesirable because: it requires the accumulator chamber to be particularly positioned; it requires the extra cap welding step; and the evaporator panel produced has the accumulator chamber caps projecting beyond its opposite edges.

The principal object of this invention is to provide a better answer to the problem of forming large chambers in pressure welded evaporator panels.

Other objects of this invention are: to provide a novel method of making a pressure welded panel containing a large internal chamber which has a greater internal volume per area of the enclosing walls than can be obtained in the "grid" type of chamber; to provide a novel method of making a pressure welded panel containing a bulbar or arcuate walled chamber which can be positioned anywhere in the panel and does not require a separate cap welding operation; and to provide a novel method of making a pressure welded panel having a bulbar chamber enclosed by reinforced walls.

These objects are attained by a method comprising: forming a pressure welded panel having an unwelded internal area defining a relatively large chamber and a smaller connected passageway; introducing a high fluid pressure to said internal area to expand the walls of said chamber and said passageway with said panel being confined between opposed spaced flat surfaces which limit the height that the walls of said chamber and said passageway are expanded; and introducing a relatively lower fluid pressure to said internal area to expand the walls of said chamber further while the walls of said passageway are confined between opposed surfaces which restrict them from being expanded further.

The chamber walls may be allowed to expand freely during the additional expansion step of the method, or their further expansion may be limited by: fixed flat platens; fixed platens having chamber wall forming cavities; spring mounted flat platens; spring mounted platens having wall forming cavities; sponge rubber platens; and platens having corrugated surfaces to shape the tops of the chamber walls into a series of lateral reinforcing ribs.

The invention is illustrated in the accompanying drawings wherein.

Figure 1:
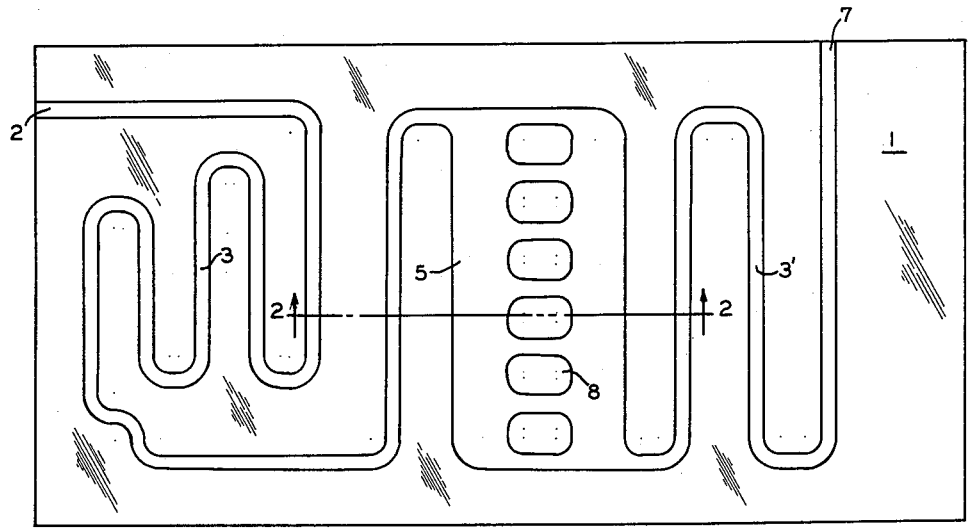
FIG. 1 is a face view of a flat walled evaporator panel.
Figure 2:
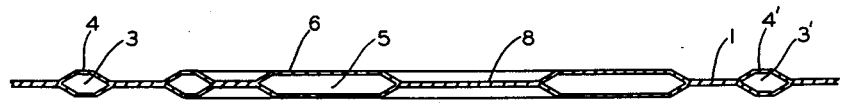
FIG. 2 is a section taken on line 2—2 of FIG. 1.

Preparatory to practicing the novel additional expansion step of the subject invention, it is necessary to provide a flat-walled refrigeration evaporator panel such as the flat-walled panel 1 illustrated in FIGS. 1 and 2. The formation of the panel 1, with the exception of the selection of the passageway pattern, is conventional and is described in the previously mentioned Long patent, No. 2,662,273. As the format'on of the panel 1 is conventional, it will be only briefly described to facilitate an understanding of the subject invention.

The initial step of making the panel 1 comprises the sandwiching of a foreshortened weld resist passageway pattern between a pair of foreshortened metal sheets to form a foreshortened sandwich assembly. The foreshortened metal sheets are preferably of aluminum but may be of other suitable metals such as copper or brass. The metal sheets and the weld resist pattern are described as being foreshortened because they will be elongated by the later roll welding step to about three times their original dimension in the direction of rolling. Also, the foreshortened weld resist pattern must be correspondingly distorted in the rolling direction so that it will be of the desired shape after being elongated.

The next step in forming the panel 1 is to heat the foreshortened sandwich assembly to a suitable rolling temperature and to roll it to pressure weld the overlapped faces of the metal sheets together along their facial areas which are not separated by the weld resist pattern, and at the same time, to elongate the metal sheets and the sandwiched weld resist pattern to substantially their final sizes. The product of this step is a panel containing a potential passageway area having walls formed by the unwelded portions of the facing sheets which are separated by the elongated weld resist pattern.

The walls of the potential passageway area of the panel are then pressure expanded or dilated by confining the faces of the panel between a pair of spaced flat platens and introducing a high fluid pressure into the potential passageway area. The high fluid pressure expands the potential passageway walls outwardly into engagement with the flat surfaces of the confining platens. As a result of such engagement, the tops of all the passageway walls are equal in height and are flat as shown in FIG. 2. Suitable fluid pressures for carrying out this step normally range between 2000 p.s.i. and 10,000 p.s.i.

The refrigeration evaporator panel 1 illustrated in FIGS. 1 and 2 contains a continuous internal conduit 2 which includes an inlet, also designated 2, at an edge of the panel; a small serpentine passageway 3 enclosed by flat-topped walls 4; an accumulator chamber 5 enclosed by flat-topped walls 6; a second small serpentine passageway 3' enclosed by flat-topped walls 4'; and an outlet 7. The accumulator chamber walls 6 are illustrated as being welded together at a series of intermediate islands 8 which are desirable in forming very large accumulator chambers.

After the flat walled evaporator panel 1 is conventionally made as described, it is then subjected to the novel additional or further expansion step of the subject invention. This novel further expansion step includes additionally expanding or dilating the walls 6 of the accumulator chamber 5 while restricting the small passageway walls 4 and 4' from being expanded further. As a result of subjecting the panel 1 to the additional expansion step, the volume or capacity of the accumulator chamber 5 is increased and the formerly flat-topped walls 6 of the accumulator chamber are rounded out into arcuate walls which are able to withstand higher internal pressures than flat-topped walls without bulging or otherwise distorting.

Figure 3:
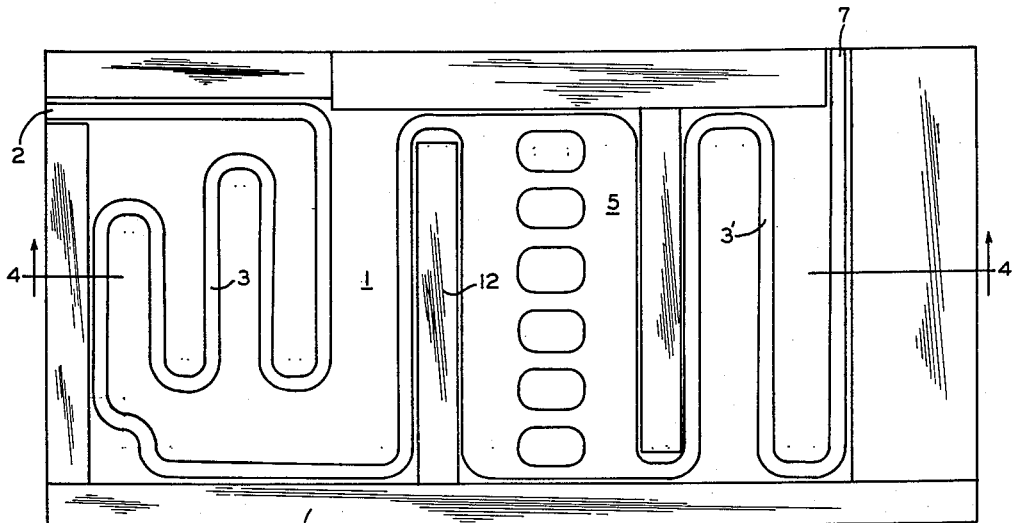
FIG. 3 is a face view of the evaporator panel of FIGS. 1 and 2 showing the position of the hold-down blocks used to clamp the unexpanded portions of the panel faces while performing the additional expansion step of the subject invention.
Figure 4:
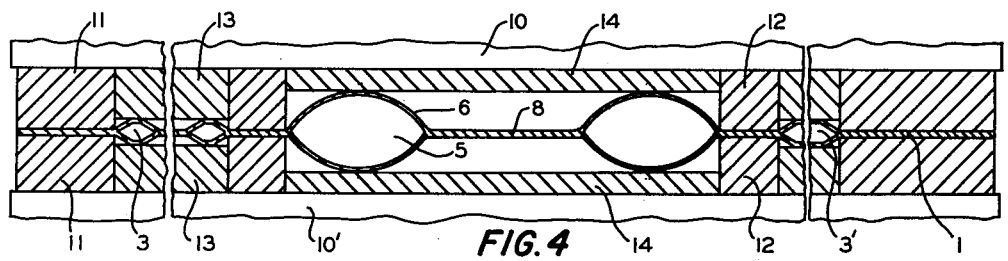
FIG. 4 is a section taken on line 4—4 of FIG. 3 showing the evaporator confined between spaced platens and its accumulator walls being additionally expanded against fixed flat plates.

One embodiment of apparatus for practicing this additional expansion step is illustrated in FIGS. 3 and 4. In this embodiment, the panel 1 is supported between a pair of spaced platens 10, 10' by an arrangement of hold-down blocks interposed between each panel face and the adjacent platen. Each arrangement of hold-down blocks includes an open frame 11 of hold-down blocks positioned around the unexpanded edge portions of the panel face and intermediate hold-down blocks 12 positioned along the unexpanded surfaces adjacent the opposite longitudinal edges of the accumulator chamber 5 as shown in FIG. 4.

Suitable flat plates 13 are interposed between the flat-tops of the small passageway walls 4 and 4' and the spaced platens 10, 10' to restrict the small passageway walls from being expanded further during the additional expansion step. The plates 13 are thick enough to snugly fill the space between the flat tops of the small passageway walls and the adjacent platens. Thinner plates 14 are interposed between the tops of the accumulator chamber walls 6 and the spaced platens. The plates 14 are thin enough to allow the flat-topped accumulator walls 6 to expand further a desired amount.

The platens 10, 10' are supported by an appropriate mechanism for opening and closing movement between a wide spacing where the panel 1 can be conveniently inserted or removed from the platens and a smaller spacing (shown in FIG. 4) where the panel 1 is rigidly gripped by the hold-down blocks between the platens. After the panel is properly positioned between the hold-down blocks 11 and 12 and the plates 13 and 14, the platens 10, 10' are closed to the spaced position shown in FIG. 4 and a suitable value of fluid pressure is introduced into the conduit 2 of the panel to further expand and round out the accumulator walls 6 to the substantially arcuate or bulbar shape illustrated in FIG. 4. Preferably the fluid pressure introduced into the conduit 2 is maintained low enough so that the engagement between the arcuate accumulator walls and the plates 14 will be limited to a relatively thin line extending along the tops of the accumulator walls. The use of the expansion limiting plates 14 enables the controlling of the height which the accumulator walls 6 are further expanded and consequently enables the controlling of the final volume of the accumulator chamber 5. Normally, a suitable value of fluid pressure for accomplishing this additional expansion step will range from 100 p.s.i. to 1000 p.s.i.

Figure 5:
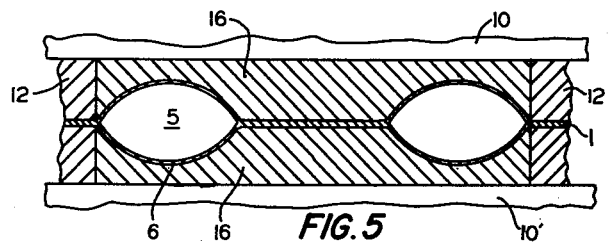
FIG. 5 is a section similar to FIG. 4 showing the accumulator walls being additionally expanded against fixed cavitied plates.

FIG. 5 illustrates a second embodiment of apparatus for performing the additional expansion step in which the flat plates 14 of FIGS. 3 and 4 are replaced by plates 16 having wall forming cavities for controlling the final size and shape of the accumulator walls 6. These cavitied plates 16 provide a still more precise control of the final shape and volume of the accumulator chamber 5 than that provided by the flat plates 14 of FIGS. 3 and 4.

Figure 6:
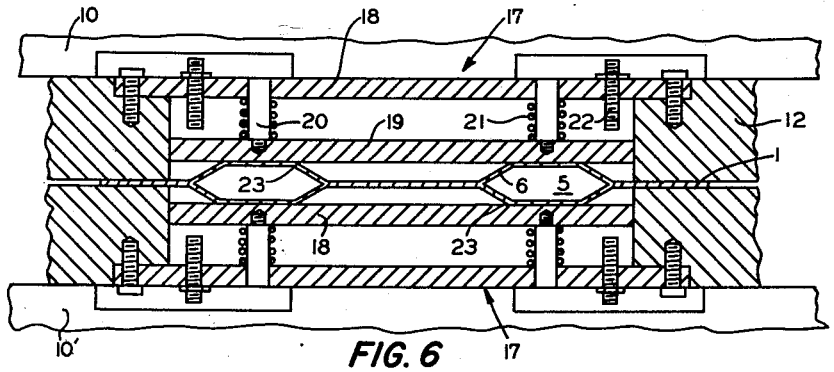
FIG. 6 is a section similar to FIG. 4 showing the accumlator walls confined between spring biased flat plates prior to being additionally expanded.
Figure 7:
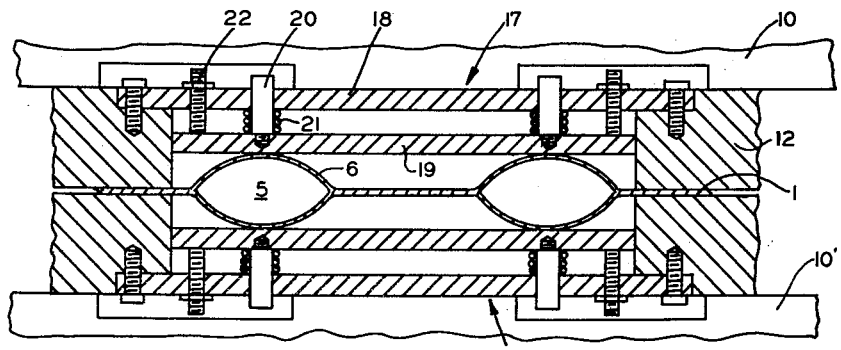
FIG. 7 is a section similar to FIG. 6 showing the accumulator walls being additionally expanded.

Another embodiment is illustrated in FIGS. 6 and 7 in which the flat plates 14 of FIGS. 3 and 4 are replaced by a pair of spring biased assemblies 17, each of which comprises a stationary plate 18 supported by the hold-down blocks 12, and a movable flat plate 19 having guide pins 20 sliding in apertures in the stationary plate 18. The movable plate 19 is biased inwardly toward the panel 1 by springs 21 mounted on the pins 20 and its outward expansion movement is limited by the adjustable stop screws 22 threaded in the stationary plate 18.

The flat topped walls 6 of the accumulator chamber 5 are shown in FIG. 6 engaged between the assemblies 17 prior to being additionally or further expanded. When the accumulator walls are properly positioned between the assemblies 17 and the platens 10, 10' are closed to the spaced position shown in FIG. 6, fluid pressure is introduced to the conduit 2 of the panel 1 to expand the accumulator walls progressively outward until reaching the shape shown in FIG. 7. By using the spring biased assemblies 17, 17' to continuously resiliently engage the tops of the accumulator walls 6 during their further expansion, the sharp bends 23 along the opposite edges of the flat tops of the accumulator walls 6 are progressively moved across the walls during their further expansion. By moving the bends 23 progressively across the walls 6, the metal of the walls is cold-worked which increases the strength of the accumulator walls 6.

Figure 8:
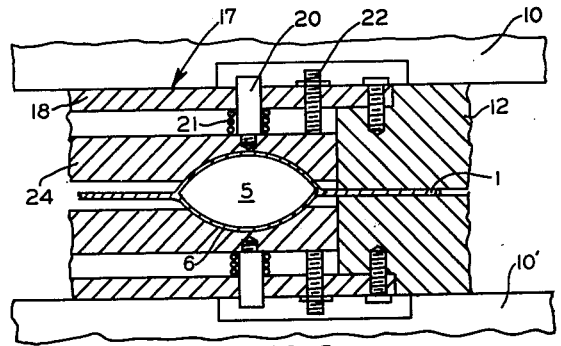
FIG. 8 is a section similar to FIG. 7 showing the accumulator walls being additionally expanded against spring biased cavitied plates.

In the embodiment illustrated in FIG. 8, the spring biased flat plates 19 of FIGS. 6 and 7 are replaced by plates 24 having cavities to receive and shape the further expansion of the accumulator walls.

Figure 9:
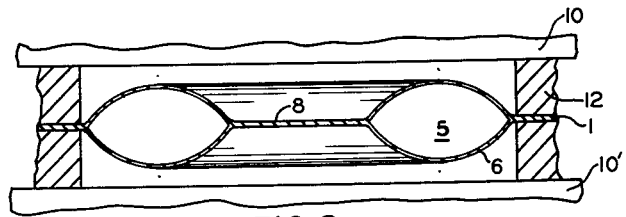
FIG. 9 is a section similar to FIG. 4 showing the accumulator walls being additionally expanded while unconfined.

The embodiment illustrated in FIG. 9 is the same as the embodiment of FIGS. 3 and 4 except that the flat plates 14 for limiting the expansion of the accumulator walls are omitted so that the amount of further expansion of the accumulator walls is only determined by the fluid pressure used to expand the accumulator walls.

Figure 10:
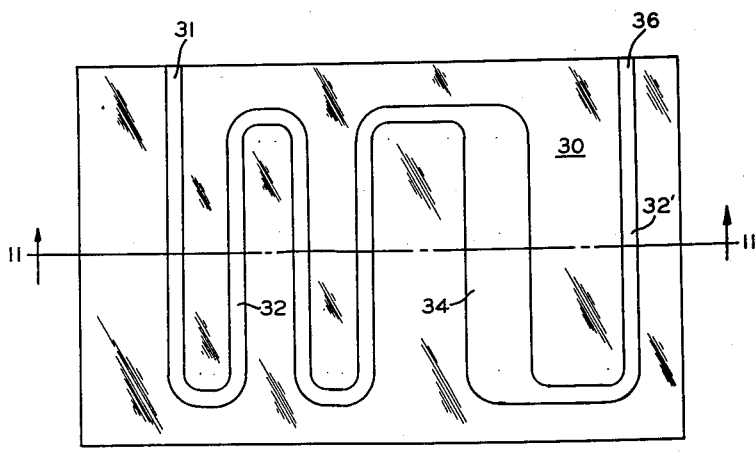
FIG. 10 is a face view of another embodiment of a flat walled evaporator panel.
Figure 11:
FIG. 11 is a section taken on line 11—11 of FIG. 10.

Another flat-topped evaporator panel 30 having a different passageway pattern is illustrated in FIGS. 10 and 11 and contains an internal continuous conduit 31 containing an inlet, also designated 31, a small passageway 32 enclosed by flat-topped walls 33; an accumulator chamber 34 enclosed by flat-topped walls 35; a second small passageway 32' enclosed by flat-topped walls 33'; and an outlet 36. The panel 30 is made by the same conventional method as the panel 1 of FIGS. 1 and 2.

Figure 12:
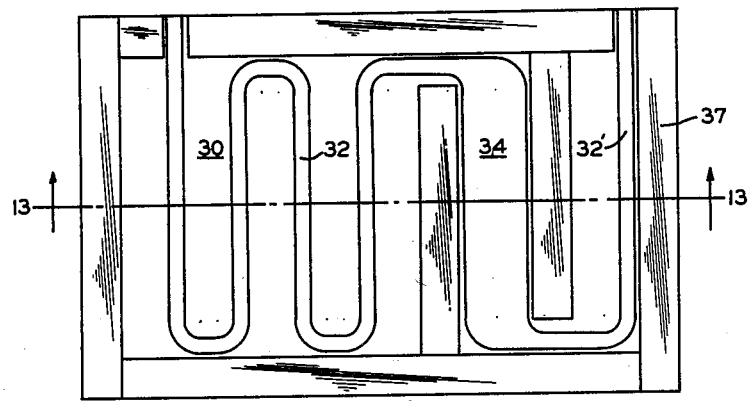
FIG. 12 is a face view of the panel of FIG. 10 showing the positions of the hold-down blocks used during the additional expansion of its accumulator walls.
Figure 13:
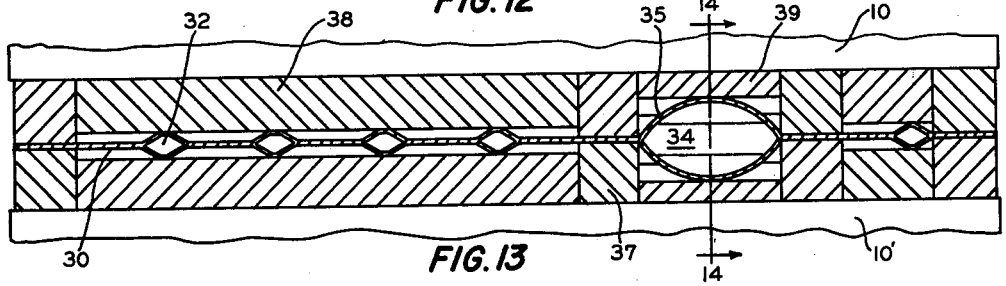
FIG. 13 is a section taken on line 13—13 of FIG. 12 showing the accumulator walls being additionally expanded against corrugated plates.
Figure 14:
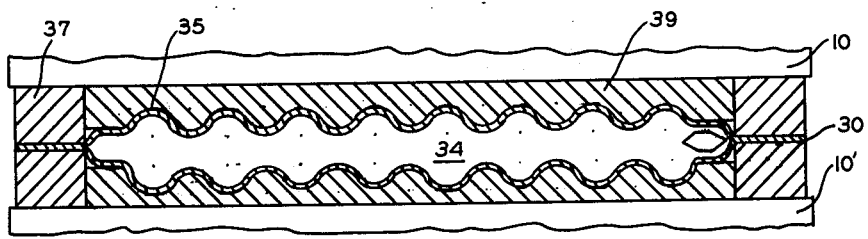
FIG. 14 is a section taken on line 14—14 of FIG. 13.

An apparatus is illustrated in FIGS. 12 to 14 for further expanding the accumulator chamber walls 35 and for longitudinally corrugating the tops of the walls 35 to increase the strength of the walls for resisting bulging or distorting from internal pressures contained in the accumulator chamber 34.

In this embodiment, the panel 30 is supported between spaced platens 10, 10' by an arrangement of hold-down blocks 37 interposed between the unexpanded portions of each panel face and its adjacent platen and positioned on each panel face as illustrated in FIG. 12. Suitable flat plates 38 are interposed between the flat tops of the small passageway walls 33 and 33' and the adjacent platens to keep the walls of the small passageways from further expanding during the additional expansion of the accumulator walls 35. Plates 39 having longitudinally extending corrugated surfaces are interposed between the tops of the accumulator chamber walls 35 and the adjacent platens 10, 10'.

After the flat topped panel 30 is properly positioned between the platens 10, 10', the hold-down blocks 37, the flat plates 38 and the corrugated plates 39, the platens are moved together to the position of FIG. 13 in which the unexpanded portions of the panel 30 are rigidly clamped between the hold-down blocks 37 and the flat plates 38 are snugly engaged between the platens and the flat tops of the small passageway walls 33 and 33'. A suitable value of fluid pressure is then admitted to the interior of the panel 30 to dilate or expand the flat-topped accumulator walls 35 outwardly into engagement with the corrugated surfaces of the plates 39 to corrugate or shape the tops of the accumulator walls 35 longitudinally as seen in FIG. 14.

Figure 15:
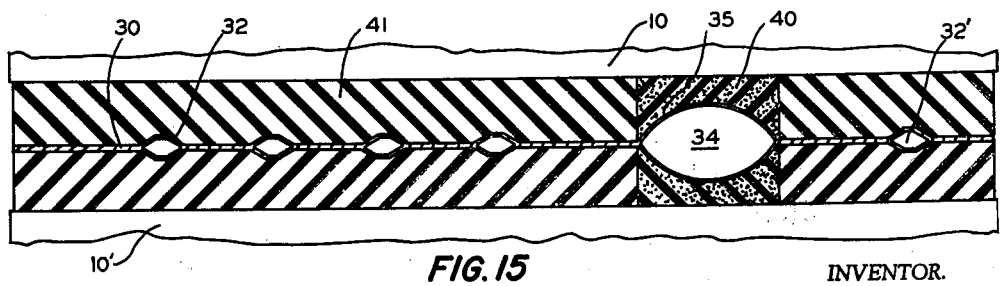
FIG. 15 is a section similar to FIG. 13 showing the accumulator walls being additionally expanded against sponge rubber pads.

FIG. 15 illustrates still another embodiment of apparatus for performing the additional or further expansion step. In this embodiment, the panel 30 is confined between the platens 10, 10' with sponge rubber pads 40 interposed between the accumulator walls and the adjacent platens and with relatively harder rubber pads 41 interposed between the remaining panel surfaces and the adjacent platens. When fluid pressure is introduced into the panel 30, the accumulator walls can expand further against the relatively soft sponge rubber pads 40 while the walls of the passageway walls 33 and 33' are kept from expanding further by the harder rubber pads 41.

In a commercial aluminum panel of the character shown in FIG. 4, which was made by applicants' two step expansion method, the width of the weld resist pattern for the small passageway was .438 inch, the width of the patterns for the islands 8 was 1.750 inches and the width of the weld resist pattern for the large passageway at each end of each island 8 of the accumulator chamber was 1.250 inches, making the overall width of the accumulator chamber equal to 4.25 inches. After rolling, the panel had a thickness of .070 inch, the small passageway pattern a width of .438 inch and the large accumulator passageway pattern a width of 1.250 inches.

In the first or high pressure expansion step, the passageway and accumulator walls were expanded between platens spaced apart .210 inch. The expansion pressure employed was 2500 p.s.i. However, any of the high expansion pressures conventionally employed could be used, the term "high" here indicating a conventional expansion pressure, which is above the free rupture pressure of the metal. Upon the completion of this step, the overall thickness of the expanded portion of the panel, or the distance between the outer surfaces of the opposite tops of the passageway walls and the accumulator walls, was .210 inch.

In the second or low pressure expansion step, the passageway walls were constrained from expanding further, while the accumulator walls were allowed to expand to an overall thickness of .562 inch (the distance between the outer surfaces of the opposite tops of the accumulator walls was .750 inch). The expansion pressure employed was 400 p.s.i. However, any of the low expansion pressures conventionally employed could be used, the term "low" here indicating any conventional expansion pressure, which is below the free rupture pressure of the metal.

Having described our invention, we claim:

1. A method of making a pressure welded passageway panel containing an enlarged chamber interconnected with a smaller passageway, comprising: forming an unexpanded pressure welded panel having a non-welded internal area shaped to define, when expanded, a relatively large chamber and a smaller connected passageway; expanding the walls of said chamber and said passageway by introducing a high pressure fluid into said internal area while said panel is confined between opposed spaced surfaces which limit the height to which the walls of said chamber and said passageway are expanded; and additionally expanding the walls of said chamber by introducing a relatively lower fluid pressure into said internal area while the walls of said smaller passageway are confined between opposed surfaces which keep them from being further expanded.

2. The method of claim 1 wherein: said expansion of said chamber walls is performed while said chamber walls are unconfined.

3. The method of claim 1 wherein: said additional expansion of said chamber walls is performed while confining said chamber walls between spaced expansion-limiting plates.

4. The method of claim 3 wherein: said spaced expansion-limiting plates are flat.

5. The method of claim 3 wherein: said spaced expansion-limiting plates have a chamber wall shaping cavity.

6. The method of claim 3 wherein: said spaced expansion-limiting plates have corrugated surfaces for shaping said chamber walls into corresponding corrugated surfaces 7. The method of claim 3 wherein: said expansion-limiting plates are spring biased against said chamber walls continuously during their additional expansion thereby causing the metal of said chamber walls to be worked and strengthened as said plates are moved outwardly by the expanding chamber walls.

8. The method of claim 1 wherein: said additional expansion of said chamber walls is performed while confining said chamber walls between expansion-limiting elastic pads.

9. The method of claim 1 wherein: said additional expansion of said chamber walls is performed while the unexpanded portions of said panel are rigidly supported in a stationary position to keep the panel from warping.

10. The method of claim 9 wherein: said panel is rigidly supported along the border of said chamber with the unexpanded panel portions.

11. A method of making a pressure welded passageway panel containing an enlarged chamber interconnected with a smaller passageway, comprising: forming an unexpanded pressure welded panel having a non-welded internal area shaped to define, when expanded, a relatively large chamber and a smaller connected passageway; expanding the walls of said chamber and said passageway by introducing a high pressure fluid into said internal area while said panel is confined between opposed space surfaces which limit the height to which the walls of said chamber and said passageway are expanded; and additionally expanding the walls of said chamber a substantial amount by introducing a relatively lower fluid pressure into said internal area substantially without further expanding the walls of the smaller connected passageway.

References Cited in the file of this patent

UNITED STATES PATENTS

| | | |
|---|---|---|
| 1,999,229 | Benedict | Apr. 30, 1935 |
| 2,344,743 | Smith | Mar. 21, 1944 |
| 2,498,275 | Johnson | Feb. 21, 1950 |
| 2,662,273 | Long | Dec. 15, 1953 |
| 2,690,002 | Grenell | Sept. 28, 1954 |
| 2,740,188 | Simmons | Apr. 3, 1956 |
| 2,749,867 | Engel | June 12, 1956 |
| 2,783,727 | Hoffmann | Mar. 5, 1957 |
| 2,857,659 | Staples | Oct. 28, 1958 |
| 2,933,806 | Bleikamp | Apr. 26, 1960 |

FOREIGN PATENTS

| | | |
|---|---|---|
| 212,362 | Australia | June 27, 1957 |